United States Patent
Fu et al.

(10) Patent No.: US 10,547,839 B2
(45) Date of Patent: Jan. 28, 2020

(54) BLOCK LEVEL RATE DISTORTION OPTIMIZED QUANTIZATION

(71) Applicant: Intel Corporation, Santa Clara, CA (US)

(72) Inventors: Fangwen Fu, Folsom, CA (US); Srinivasan Embar Raghukrishnan, Folsom, CA (US); Atthar H. Mohammed, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 59 days.

(21) Appl. No.: 15/651,620

(22) Filed: Jul. 17, 2017

(65) Prior Publication Data

US 2019/0020872 A1 Jan. 17, 2019

(51) Int. Cl.
| | | |
|---|---|---|
| *H04N 19/147* | (2014.01) | |
| *H04N 19/124* | (2014.01) | |
| *H04N 19/52* | (2014.01) | |
| *H04N 19/176* | (2014.01) | |
| *G06F 17/11* | (2006.01) | |
| *H04N 19/103* | (2014.01) | |

(52) U.S. Cl.
CPC ......... *H04N 19/124* (2014.11); *H04N 19/176* (2014.11); *H04N 19/52* (2014.11); *G06F 17/11* (2013.01); *H04N 19/103* (2014.11)

(58) Field of Classification Search
CPC .......................... H04N 19/124; H04N 19/176
See application file for complete search history.

(56) References Cited

U.S. PATENT DOCUMENTS

| | | | |
|---|---|---|---|
| 9,510,028 B2 * | 11/2016 | Yang ............... | H04N 21/234309 |
| 2008/0043643 A1 * | 2/2008 | Thielman ............. | H04N 19/196 370/260 |
| 2013/0279581 A1 * | 10/2013 | Lee ........................ | H04N 19/51 375/240.12 |
| 2014/0362911 A1 * | 12/2014 | Puri ..................... | H04N 19/176 375/240.12 |
| 2016/0127725 A1 * | 5/2016 | Jamali .................. | H04N 19/103 375/240.12 |

* cited by examiner

*Primary Examiner* — Md N Haque
(74) *Attorney, Agent, or Firm* — Jordan IP Law, LLC

(57) ABSTRACT

Systems, apparatus and methods are described including operations for video coding rate control including Rate Distortion Optimized Quantization on a block-by-block basis.

19 Claims, 8 Drawing Sheets

300

DETERMINE WHETHER A CURRENT CODING BLOCK IS INTRA CODED OR INTER CODED
302

COUNT A NUMBER OF ALREADY QUANTIZED INTRA CODED BLOCKS
304

PERFORM RATE DISTORTION OPTIMIZED QUANTIZATION UNTIL A THRESHOLD BLOCK VALUE IS REACHED
306

BYPASS RATE DISTORTION OPTIMIZED QUANTIZATION WHEN THE THRESHOLD BLOCK VALUE IS REACHED
308

FIG. 3

BLOCK LEVEL RATE DISTORTION OPTIMIZED QUANTIZATION

BACKGROUND

A video encoder compresses video information so that more information can be sent over a given bandwidth. The compressed signal may then be transmitted to a receiver that decodes or decompresses the signal prior to display.

Rate control often used to control the number of generated bits for various video applications. Usually, the application provides a target bit rate and buffer constraint to the rate control module. The rate control module may use this information to control the encoding process such that target bit rate is met and buffer constraint is not violated.

Such a target bit rate oriented approach may waste bits when the video quality is already very good. In order to solve this problem, one solution is to use a constant minimum quantization parameter (QP) to cap the QP generated by the rate control module.

Similarly, Rate Distortion Optimized Quantization (RDOQ) often improves the coding efficiency (e.g., Bjøntegaard-Delta (BD) Rate) for many video codec (e.g., Advanced Video Coding (AVC), High Efficiency Video Coding (HEVC), etc.). Such an RDOQ is often set at the frame level.

For example, Rate Distortion Optimized Quantization (RDOQ) is typically part of quantization operations in an encoder (e.g., JPEG, MPEG2, AVC, HEVC, VP9, and AV1 etc.). RDOQ typically determines the optimal quantization level of each transform coefficient among multiple quantization level candidates by minimizing the sum of rate distortion costs in each block.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 3 is a flow diagram illustrating an example coding process;

DESCRIPTION OF EMBODIMENTS

Figure 1:
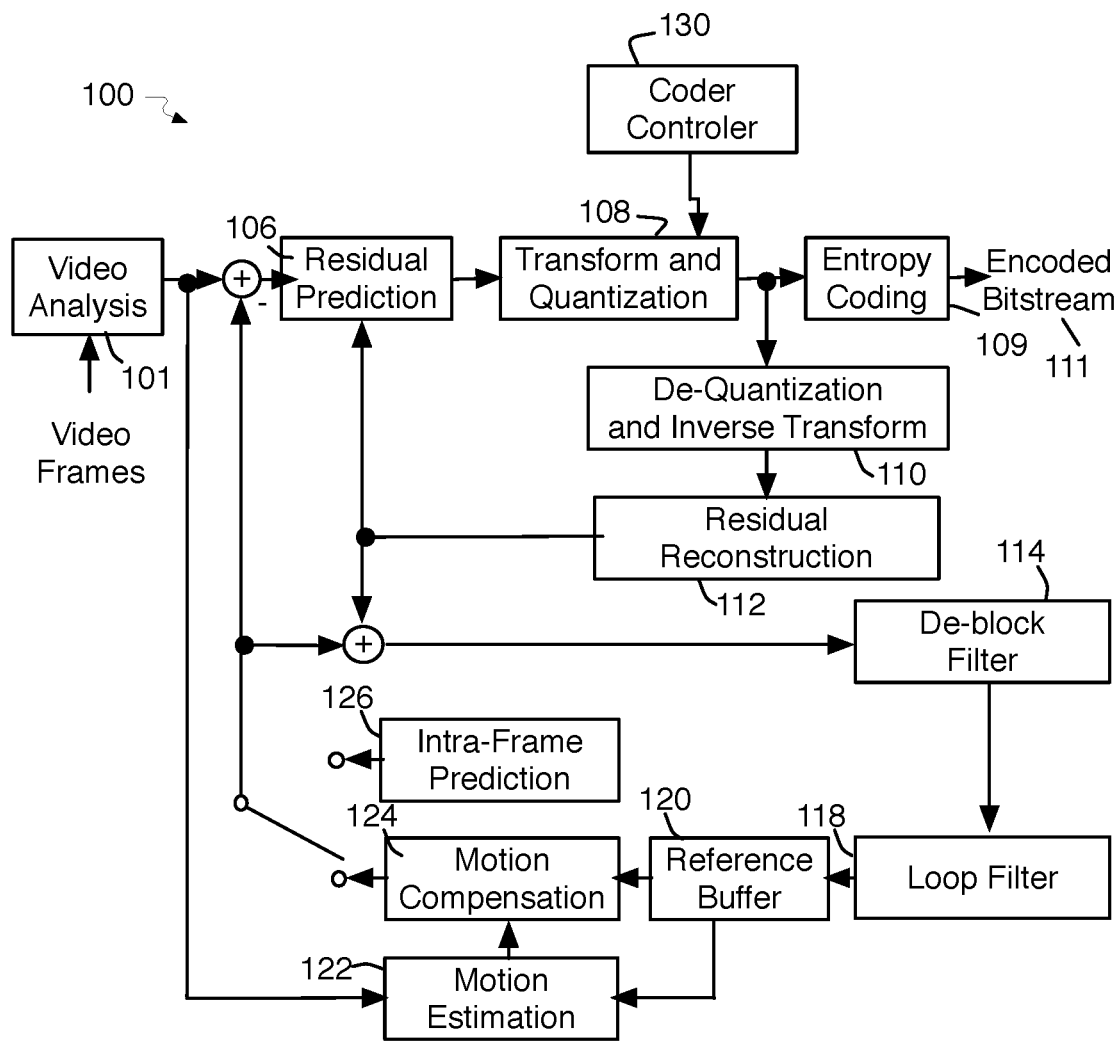
FIG. 1 is an illustrative diagram of an example video coding system.

While the following description sets forth various implementations that may be manifested in architectures such system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of one skilled in the art to effect such feature, structure, or characteristic in connection with other implementations whether or not explicitly described herein.

Systems, apparatus, articles, and methods are described below including operations for video coding rate control including Rate Distortion Optimized Quantization on a block-by-block basis.

As described above, Rate Distortion Optimized Quantization (RDOQ) often improves the coding efficiency (e.g. Bjøntegaard-Delta (BD) Rate) for many video codec (e.g. Advanced Video Coding (AVC), High Efficiency Video Coding (HEVC), etc.). The RDOQ enabling is often set at the frame level. For example, a determination may be made at a coder to enable or disable RDOQ processing on a frame-by-frame basis, so that any given frame may be entirely processed via RDOQ processing, or instead the entire frame may bypass such RDOQ processing.

However, the present disclosure notes that such an enabling RDOQ at the frame level may have performance impact. For example, enabling RDOQ at the frame level may have performance impact of up to a two times slowdown. Such a slow down may be especially noticed for the processing of intra blocks (e.g., referring to intra macroblock in AVC and intra coding unit in HEVC). The processing of intra blocks may cause such a slow down due to a feedback loop on the block boundary in intra prediction.

For example, in RDOQ implementations (e.g., especially hardware implementations), it may be noticed that inter block performance drop with RDOQ enabled is negligible compared to RDOQ being disabled. However, intra block performance could get a significant drop (up to a two times slow-down) when RDOQ is enabled due to an intra prediction in-loop feedback. Without some type of performance control, the RDOQ processing could introduce up to a two times performance drop when the encoded content requires high percentage of intra blocks.

Accordingly, one or more of the embodiments discussed below propose to have fine granularity control to enable/disable RDOQ processing on-the-fly on a block-by-bock basis (e.g., per block basis). For example, such processing to enable/disable RDOQ processing on a block-by-bock basis maybe based at least in part on an accumulated intra block counting. In such an implementation, since the RDOQ appears to have the most performance impact on the intra block, one or more of the embodiments discussed below may include a mechanism to control RDOQ enabling/disabling based on a counting of the intra blocks being processed. In this way, it may be feasible to achieve an advantageous trade-off between the coding efficiency and RDOQ performance. As discussed above, one conventional RDOQ solution is to enable RDOQ for the whole frame without considering the performance impact. Conversely, with one or more of the embodiments discussed below with the on-the-fly control of RDOQ on a per block basis, an advantageous trade-off between the coding efficiency and RDOQ performance may be obtained.

FIG. 1 is an illustrative diagram of an example video coding system 100, arranged in accordance with at least some implementations of the present disclosure. In various implementations, video coding system 100 may be configured to undertake video coding and/or implement video codecs according to one or more advanced video codec standards, such as, for example, the High Efficiency Video Coding (HEVC) H.265 video compression standard, but is not limited in this regard. Further, in various embodiments, video coding system 100 may be implemented as part of an image processor, video processor, and/or media processor.

As used herein, the term "coder" may refer to an encoder and/or a decoder. Similarly, as used herein, the term "coding" may refer to encoding via an encoder and/or decoding via a decoder. For example video coding system 100 may include video encoder with an internal video decoder, as illustrated in FIG. 1, while a companion coder may only include a video decoder (not illustrated independently here), and both are examples of a "coder" capable of coding.

In some examples, video coding system 100 may include additional items that have not been shown in FIG. 1 for the sake of clarity. For example, video coding system 100 may include a processor, a radio frequency-type (RF) transceiver, a display, an antenna, and/or the like. Further, video coding system 100 may include additional items such as a speaker, a microphone, an accelerometer, memory, a router, network interface logic, and/or the like that have not been shown in FIG. 1 for the sake of clarity.

In some examples, during the operation of video coding system 100 for the encoding of video content, current video information may be provided to a video analysis module 101 in the form of a frame of video data. The current video frame may be analyzed (e.g., the frame type and/or hierarchical dependency might be determined at this stage) and then passed to a residual prediction module 106. The output of residual prediction module 106 may be subjected to known video transform and quantization processes by a transform and quantization module 108. The output of transform and quantization module 108 may be provided to an entropy coding module 109 and to a de-quantization and inverse transform module 110. Entropy coding module 109 may output an entropy encoded bitstream 111 for communication to a corresponding decoder.

Within an internal decoding loop of video coding system 100, de-quantization and inverse transform module 110 may implement the inverse of the operations undertaken by transform and quantization module 108 to provide the output of residual prediction module 106 to a residual reconstruction module 112. Those skilled in the art may recognize that transform and quantization modules and de-quantization and inverse transform modules as described herein may employ scaling techniques. The output of residual reconstruction module 112 may be fed back to residual prediction module 106 and may also be provided to a loop including a de-blocking filter 114, a loop filter 118 (and/or other filters), a buffer 120, a motion estimation module 122, a motion compensation module 124 and an intra-frame prediction module 126. As shown in FIG. 1, the output of either motion compensation module 124 or intra-frame prediction module 126 is both combined with the output of residual prediction module 106 as input to de-blocking filter 114, and is differenced with the original video frames input to residual prediction module 106. It will be understood that the same and/or similar operations as described above may be performed in decoder-exclusive implementations of video coding system 100.

As will be explained in greater detail below, in some examples, video coding system 100 may further include a coder controller module 130 associated with quantization module 108. In some implementations, coder controller module 130 and/or quantization module 108 may be configured to have fine granularity control to enable/disable RDOQ processing on-the-fly on a block-by-bock basis (e.g., per block basis). For example, such processing to enable/disable RDOQ processing on a block-by-bock basis maybe based at least in part on an accumulated intra block counting. In such an implementation, since the RDOQ appears to have the most performance impact on the intra block, one or more of the embodiments discussed below may include a mechanism to control RDOQ enabling/disabling based on a counting of the intra blocks being processed.

As will be discussed in greater detail below, video coding system 100 may be used to perform some or all of the various functions discussed below in connection with FIGS. 2-6.

Figure 2:
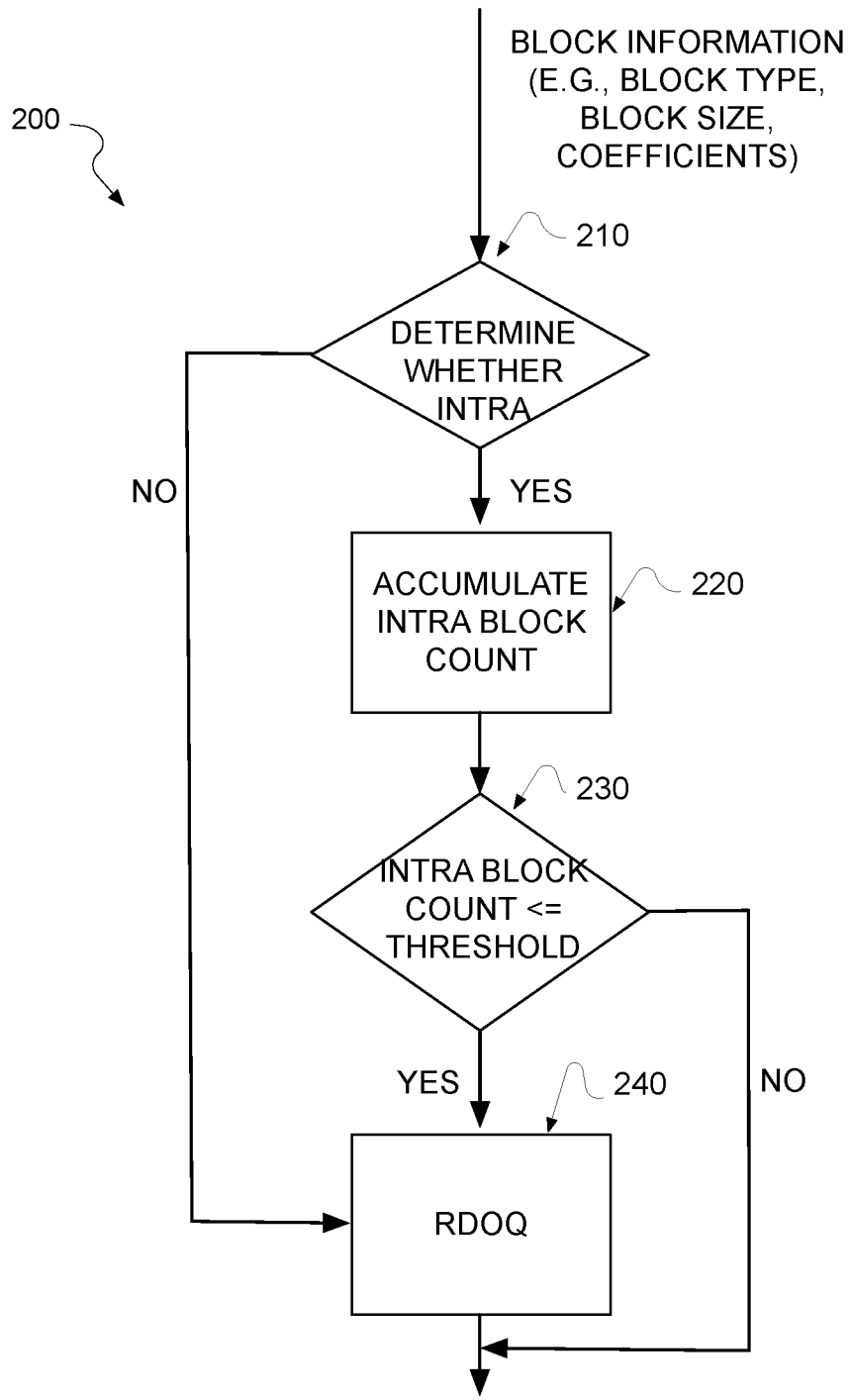
FIG. 2 is a flow chart illustrating an example quantization control coding process.

FIG. 2 is a flow diagram illustrating an example quantization control coding process 200, arranged in accordance with at least some implementations of the present disclosure. Process 200 may include one or more operations, functions or actions as illustrated by one or more of operations 202, etc.

Process 200 may begin at operation 210, "DETERMINE WHETHER INTRA", where it may be determined whether a give block is an intra block. For example, individual blocks may be examined to determine whether the individual block is an intra block.

As illustrated, the input to Process 200 includes information for each block including the block type (e.g., intra/inter), block size, and coefficients (after transform).

In instances where the individual block is determined not to be an intra block, Process 200 may continue to operation 240 "RDOQ" where Rate Distortion Optimized Quantization may be performed. For example, in instances where the individual block is determined not to be an intra block, inter blocks may bypass further analysis and be processed by Rate Distortion Optimized Quantization. In some implementations all inter blocks may be processed by Rate Distortion Optimized Quantization.

In instances where the individual block is determined to be an intra block, Process 200 may continue at operation 220, "ACCUMULATE INTRA BLOCK COUNT", where, an intra block count may be determined. For example, in instances where the individual block is determined to be an intra block, an intra block count may be increased by one count.

Process 200 may continue at operation 230, "INTRA BLOCK COUNT<=THRESHOLD", where the intra block count may be compared to an intra block threshold value. For example, a determination may be made as to whether the intra block count is under the intra block threshold value.

In instances where the intra block count is under the intra block threshold value, Process 200 may continue to operation 240 "RDOQ" where Rate Distortion Optimized Quantization may be performed. For example, in instances where the intra block count is under the intra block threshold value, intra blocks may be processed by Rate Distortion Optimized Quantization. In some implementations, the block threshold value may be set to a maximum value where all intra blocks may be processed by Rate Distortion Optimized Quantization. In other implementations, the block threshold value may be set to a minimum value where no intra blocks may be processed by Rate Distortion Optimized Quantization. In still other implementations, the block threshold value may be set to an intermediate value between the minimum value and the maximum value so that only a certain number of intra blocks per frame may be processed by Rate Distortion Optimized Quantization. For example, the block threshold value may be set to an intermediate value closer the minimum value than the maximum value for active applications that are latency sensitive. Similarly, the block threshold value may be set to an intermediate value closer the maximum value than the minimum value for active applications that are not latency sensitive.

In instances where the intra block count is over the intra block threshold value, Process 200 may bypass further RDOQ processing of intra blocks for the rest of the intra blocks in the frame being processed.

In some implementations, Process 200 may utilize a programmable input from user on the intra block count threshold (e.g., in the unit of 4×4 block). In operation, Process 200 may first checks if the input block is intra or not. If not, the coefficients of this inter block may be directly fed into the RDOQ block for coefficient optimization. Otherwise, the accumulator will increase the counter of intra block (e.g., in units of 4×4 blocks). If the accumulated counter is less than the programmed threshold, the coefficient may be fed into RDOQ for optimization. Otherwise (e.g., the counter exceeds the threshold), the coefficient may be directly output for further process without RDOQ processing.

In this proposed Process 200, it is allowed to program the intra count threshold to provide various trade-off between the achieved quality (e.g., coding efficiency) and performance. For example, when programming the threshold to be zero, all the intra block will by-pass the RDOQ process unit, which provides the gest performance for RDOQ. In contrast, when programming the threshold to be a maximum value (e.g., 0xFFFFFF for 4K resolution), all intra block will go through the RDOQ process unit for the best coding efficiency but may experience some performance drop depending on the percentage of intra blocks. By programming the threshold in between, Process 200 may provide the trade-off between the coding efficiency and performance for different applications. For example, in latency critical applications such as video conference, virtual reality, etc. Process 200 may program the threshold toward zero to get the best performance and latency. On the contrary, for the applications requiring high quality such as video broadcast, the threshold may be programmed toward max value to obtain the best quality instead by tolerating some additional performance hit.

For example, the intra block threshold value may be a zero value to turn off RDOQ processing for all intra blocks, a maximum value to turn on RDOQ processing for all intra blocks, or an intermediate value to turn on RDOQ processing for only a limited number of intra blocks. For example, the intra block threshold value maybe adjusted based at least in part on the latency sensitivity associated with an active application.

In some implementations, the intra block threshold value may be adjusted to be closer to the maximum value than the zero value in cases where the latency sensitivity of an active application indicates a non-latency critical application. Such a non-latency critical application might include server usage, such as for video streaming/broadcast, other non-latency critical applications, and/or the like. In such a case, RDOQ can be enabled for most (or all) the intra blocks for improved coding efficiency due to a less critical performance request.

In other implementations, the intra block threshold value may be adjusted to be closer to the zero value than the maximum value in cases where the latency sensitivity of an active application indicates a latency critical application. Such a latency critical application might include videoconferencing, virtual reality (VR), other latency critical applications, and/or the like. In such a case, RDOQ can be disabled for most (or all) the intra blocks to get the best performance.

Process 200 may provide for video coding, such as video encoding, decoding, and/or bitstream transmission techniques, which may be employed by a coder system as discussed herein.

Additional and/or alternative aspects of Process 200 may be described below with regard to Process 300 and/or 600.

FIG. 3 is a flow diagram illustrating an example quantization control process 300, arranged in accordance with at least some implementations of the present disclosure. Process 300 may include one or more operations, functions or actions as illustrated by one or more of operations 302, etc.

Process 300 may begin at operation 302, "DETERMINE WHETHER A CURRENT CODING BLOCK IS INTRA CODED OR INTER CODED", where a determination may be made as to whether a current coding block is intra coded or inter coded. For example, the determination may be made as to whether a current coding block is intra coded or inter coded, via a quantizer (not illustrated in this figure).

In instances where the current coding block is intra coded, Process 300 may continue to operations 304-308.

Process 300 may continue at operation 304 "COUNT A NUMBER OF ALREADY QUANTIZED INTRA CODED BLOCKS", where a number of already quantized intra coded blocks may be counted. For example the number of already quantized intra coded blocks may be counted, via the quantizer (not illustrated in this figure).

Process 300 may continue at operation 306 "PERFORM RATE DISTORTION OPTIMIZED QUANTIZATION UNTIL A THRESHOLD BLOCK VALUE IS REACHED", where Rate Distortion Optimized Quantization may be performed on intra coded blocks. For example Rate Distortion Optimized Quantization may be performed on intra coded blocks until a threshold block value is reached when compared to the counted already processed intra coded blocks, via the quantizer (not illustrated in this figure).

Process 300 may continue at operation 308 "BYPASS RATE DISTORTION OPTIMIZED QUANTIZATION WHEN THE THRESHOLD BLOCK VALUE IS REACHED", where Rate Distortion Optimized Quantization may be bypassed for intra coded blocks. For example, Rate Distortion Optimized Quantization may be bypassed for intra coded blocks when the threshold block value is reached when compared to the counted already processed intra coded blocks, via the quantizer (not illustrated in this figure).

Process 300 may provide for video coding, such as video encoding, decoding, and/or bitstream transmission techniques, which may be employed by a coder system as discussed herein.

Additional and/or alternative aspects of Process 200 may be described below with regard to Process 300 and/or 600.

Figure 4:
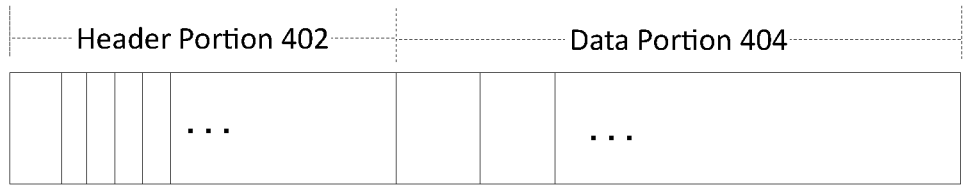
FIG. 4 illustrates an example bitstream.

FIG. 4 illustrates an example bitstream 400, arranged in accordance with at least some implementations of the present disclosure. In some examples, bitstream 400 may correspond to bitstream 111 (see, e.g., as shown in FIG. 1) output from coder 100 and/or a corresponding input bitstream to a decoder. Although not shown in FIG. 4 for the sake of clarity of presentation, in some examples bitstream 400 may include a header portion 402 and a data portion 404. In various examples, bitstream 400 may include data, indicators, index values, mode selection data, or the like associated with encoding a video frame as discussed herein. As discussed, bitstream 400 may be generated by an encoder and/or received by a decoder for decoding such that decoded video frames may be presented via a display device.

In some implementations described herein, bitstream 400 may include data related to the quantization control process described herein.

Figure 5:
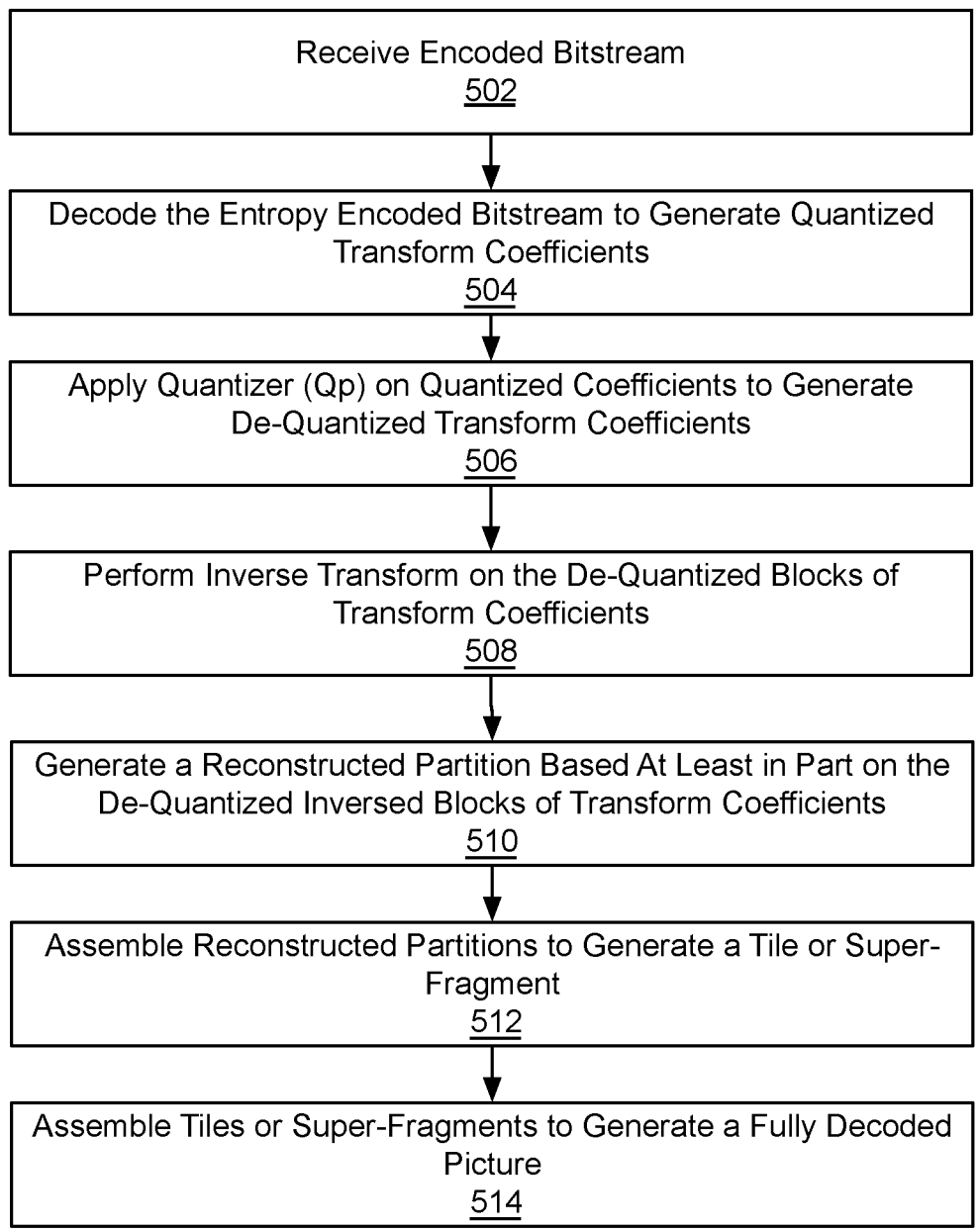
FIG. 5 is a flow diagram illustrating an example decoding process.

FIG. 5 is a flow diagram illustrating an example decoding process 500, arranged in accordance with at least some implementations of the present disclosure. Process 500 may include one or more operations, functions or actions as illustrated by one or more of operations 502, etc. Process 500 may form at least part of a video coding process. By way of non-limiting example, process 500 may form at least part of a video decoding process as might be undertaken by the internal decoder loop of coder system 100 of FIG. 1 or a decoder system (not illustrated) of the same or similar design.

Process 500 may begin at operation 502, "Receive Encoded Bitstream", where a bitstream of a video sequence may be received. For example, a bitstream encoded as discussed herein may be received at a video decoder.

Process 500 may continue at operation 504, "Decode the Entropy Encoded Bitstream to Generate Quantized Transform Coefficients", where the bitstream may be decoded to generate quantized transform coefficients. In some examples, the decoded data may include to coding partition indicators, block size data, transform type data, quantizer (Qp), quantized transform coefficients, the like, and/or combinations thereof.

Process 500 may continue at operation 506, "Apply Quantizer (Qp) on Quantized Coefficients to Generate a De-Quantized Block of Transform Coefficients", where a quantizer (Qp) may be applied to quantized transform coefficients to generate a de-quantized block of transform coefficients.

Process 500 may continue at operation 508, "Perform Inverse Transform On the De-Quantized Blocks of Transform Coefficients", where, an inverse transform may be performed on each de-quantized block of transform coefficients. For example, performing the inverse transform may include an inverse transform process similar to or the same as the inverse of any forward transform used for encoding as discussed herein.

Process 500 may continue at operation 510, "Generate a Reconstructed Partition based at least in part on the De-Quantized and Inversed Blocks of Transform Coefficients", where a reconstructed prediction partition may be generated based at least in part on the de-quantized and inversed block of transform coefficients. For example, a prediction partition may be added to the decoded prediction error data partition, which is represented by a given de-quantized and inversed block of transform coefficients, to generate a reconstructed prediction partition.

Process 500 may continue at operation 512, "Assemble Reconstructed Partitions to Generate a Tile or Super-Fragment", where the reconstructed prediction partitions may be assembled to generate a tile or super-fragment. For example, the reconstructed prediction partitions may be assembled to generate tiles or super-fragments.

Process 500 may continue at operation 514, "Assemble Tiles or Super-Fragments Generate a Fully Decoded Picture", where the tiles or super-fragments of a picture may be assembled (and/or further processed) to generate a fully decoded picture. For example, after optional filtering (e.g., deblock filtering, quality restoration filtering, and/or the like), tiles or super-fragments may be assembled to generate a full decoded picture, which may be stored via a decoded picture buffer (not shown) and/or transmitted for presentment via a display device after picture reorganization.

In operation, the de-quantization may be performed by de-quantization and inverse transform module 110 of FIG. 1, and/or by a similar or identical module in a decoder with structure corresponding to the internal decoder loop of coder system 100 of FIG. 1. Similarly, in some implementations, the inverse transform of Process 500 may be performed by de-quantization and inverse transform module 110 of FIG. 1, and/or by a similar or identical module in a decoder with structure corresponding to the internal decoder loop of coder system 100 of FIG. 1. Those skilled in the art may recognize that the inverse transformation process acting on the de-quantized data may be similar to the forward transformation of 108 in operation but with a different transformation matrix.

Some additional and/or alternative details related to process 200, 300, 500 and other processes discussed herein may be illustrated in one or more examples of implementations discussed herein and, in particular, with respect to FIG. 4 below.

Figure 6:
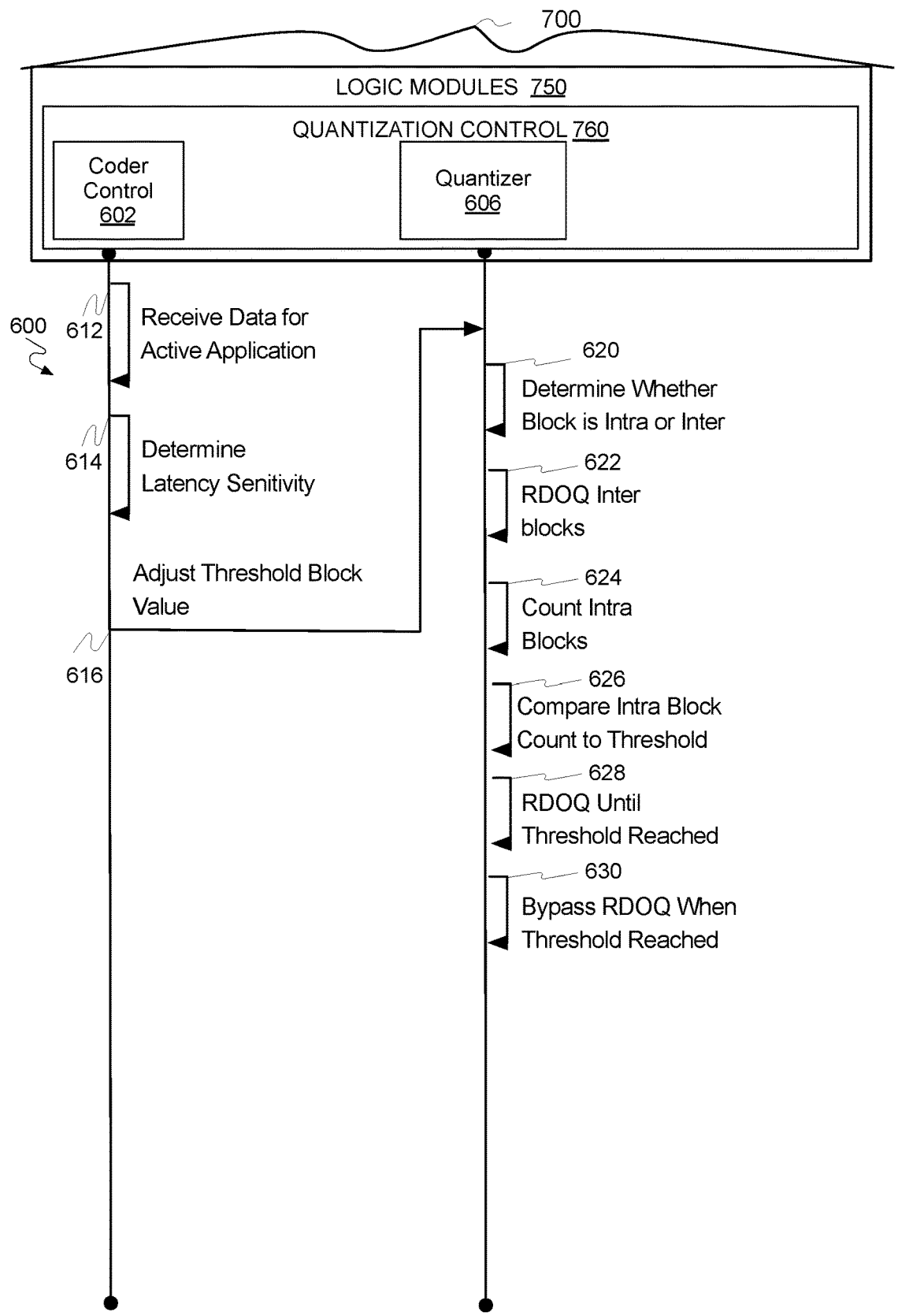
FIG. 6 provides an illustrative diagram of an example video coding system and video coding process in operation.

FIG. 6 provide an illustrative diagram of an example video coding system 700 (see, e.g., FIG. 7 for more details) and video coding process 600 in operation, arranged in accordance with at least some implementations of the present disclosure. In the illustrated implementation, process 600 may include one or more operations, functions or actions as illustrated by one or more of actions 612, etc.

By way of non-limiting example, process 600 will be described herein with reference to example video coding system 700 including coder 100 of FIG. 1, as is discussed further herein below with respect to FIG. 7. In various examples, process 600 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

As illustrated, video coding system 700 (see, e.g., FIG. 7 for more details) may include modules 750. For example, modules 750 may include any modules as discussed with respect to any of the coder systems or subsystems described herein. For example, modules 750 may include a quantization control module 760 and/or the like. For example, quantization control module 760 include coder control logic module 602 and/or quantizer logic module 606, which may be configured to perform RDOQ quantization on a per block basis for intra blocks.

Process 600 may begin at operation 612, "Receive Data from Active Application", where data from an active application may be received. For example, where data from the active application may be received, via coder control logic module 602.

Process 600 may proceed from operation 612 to continue at operation 614, "Determine Latency Sensitivity", where latency sensitivity of the active application may be determined. For example, the level of latency sensitivity associated with the active application may be determined, via coder control logic module 602.

Process 600 may proceed from operation 614 to continue at operation 616, "Adjust Threshold Block Value", where a threshold block value may be adjusted. For example, the threshold block value may be adjusted based at least in part on the determined level of latency sensitivity, via coder control logic module 602.

In some implementations, the threshold block value may be set to a minimum threshold block value (e.g., zero) when the latency sensitivity is at a maximum level of latency sensitivity. Conversely, the threshold block value may be set to a maximum threshold block value when the latency sensitivity is at a minimum level of latency sensitivity.

In other implementations, the threshold block value may be set to an intermediate threshold block value when the latency sensitivity is at an intermediate level of latency sensitivity. For example, the threshold block value may be to the intermediate threshold block value near the minimum threshold block value when the latency sensitivity is at an intermediate level of latency sensitivity near the maximum level of latency sensitivity. Similarly, the threshold block value may be to the intermediate threshold block value near the maximum threshold block value when the latency sensitivity is at an intermediate level of latency sensitivity near the minimum level of latency sensitivity.

Process 600 may proceed from operation 616 to continue at operation 620, "Determine Whether Block is Intra or Inter", where a determination may be made as to whether a current coding block is Intra or Inter coded. For example, the determination may be made as to whether a current coding block is Intra or Inter coded, via the quantizer logic module 606.

Process 600 may proceed from operation 620 to continue at operation 622, "RDOQ Inter Blocks", where Rate Distortion Optimized Quantization may be performed on the Inter Blocks. For example, in instances where the current coding block is inter coded Rate Distortion Optimized Quantization may be performed on all of the inter coded blocks, via the quantizer logic module 606.

In instances where the current coding block is intra coded, Process 600 may continue to operations 624-630.

Process 600 may proceed from operation 622 to continue at operation 624, "Count Intra Blocks", where intra coded blocks may be counted. For example, the number of already quantized intra coded blocks may be counted, via the quantizer logic module 606.

Process 600 may proceed from operation 624 to continue at operation 626, "Compare Intra Block Count to Threshold", where the intra block count may be compared to the threshold block value. For example, the intra block count may be compared to the threshold block value to determine whether the intra block count has reached the threshold block value, via the quantizer logic module 606.

Process 600 may proceed from operation 626 to continue at operation 628, "RDOQ Until Threshold Reached", where Rate Distortion Optimized Quantization may be performed on intra coded blocks. For example Rate Distortion Optimized Quantization may be performed on intra coded blocks until a threshold block value is reached when compared to the counted already processed intra coded blocks, via the quantizer logic module 606.

Process 600 may proceed from operation 628 to continue at operation 630, "Bypass RDOQ When Threshold Reached", where Rate Distortion Optimized Quantization may be bypassed for intra coded blocks. For example, Rate Distortion Optimized Quantization may be bypassed for intra coded blocks when the threshold block value is reached when compared to the counted already processed intra coded blocks, via the quantizer logic module 606.

In operation, process 600 may operated with fine granularity control to enable/disable RDOQ processing on-the-fly on a block-by-bock basis (e.g., per block basis). For example, such processing to enable/disable RDOQ processing on a block-by-bock basis maybe based at least in part on an accumulated intra block counting. In such an implementation, since the RDOQ appears to have the most performance impact on the intra block, one or more of the embodiments discussed below may include a mechanism to control RDOQ enabling/disabling based on a counting of the intra blocks being processed. In this way, it may be feasible to achieve an advantageous trade-off between the coding efficiency and RDOQ performance.

Although process 600, as illustrated, is directed to coding, the concepts and/or operations described may be applied to encoding and/or decoding separately, and, more generally, to video coding.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated. Additionally, although one particular set of blocks or actions is illustrated as being associated with particular modules, these blocks or actions may be associated with different modules than the particular modules illustrated here.

Various components of the systems and/or processes described herein may be implemented in software, firmware, and/or hardware and/or any combination thereof. For example, various components of the systems and/or processes described herein may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures.

As used in any implementation described herein, the term "module" may refer to a "component" or to a "logic unit", as these terms are described below. Accordingly, the term "module" may refer to any combination of software logic, firmware logic, and/or hardware logic configured to provide the functionality described herein. For example, one of ordinary skill in the art will appreciate that operations performed by hardware and/or firmware may alternatively be implemented via a software component, which may be embodied as a software package, code and/or instruction set, and also appreciate that a logic unit may also utilize a portion of software to implement its functionality.

As used in any implementation described herein, the term "component" refers to any combination of software logic and/or firmware logic configured to provide the functionality described herein. The software logic may be embodied as a software package, code and/or instruction set, and/or firmware that stores instructions executed by programmable circuitry. The components may, collectively or individually, be embodied for implementation as part of a larger system, for example, an integrated circuit (IC), system on-chip (SoC), and so forth.

As used in any implementation described herein, the term "logic unit" refers to any combination of firmware logic and/or hardware logic configured to provide the functionality described herein. The "hardware", as used in any implementation described herein, may include, for example, singly or in any combination, hardwired circuitry, programmable circuitry, state machine circuitry, and/or firmware that stores instructions executed by programmable circuitry. The logic units may, collectively or individually, be embodied as circuitry that forms part of a larger system, for example, an integrated circuit (IC), system on-chip (SoC), and so forth. For example, a logic unit may be embodied in logic circuitry for the implementation firmware or hardware of the systems discussed herein. Further, one of ordinary skill in the art will appreciate that operations performed by hardware and/or firmware may also utilize a portion of software to implement the functionality of the logic unit.

In addition, any one or more of the blocks of the processes described herein may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks shown in FIGS. 5, 7, and 6 in response to instructions conveyed to the processor by a computer readable medium.

Figure 7:
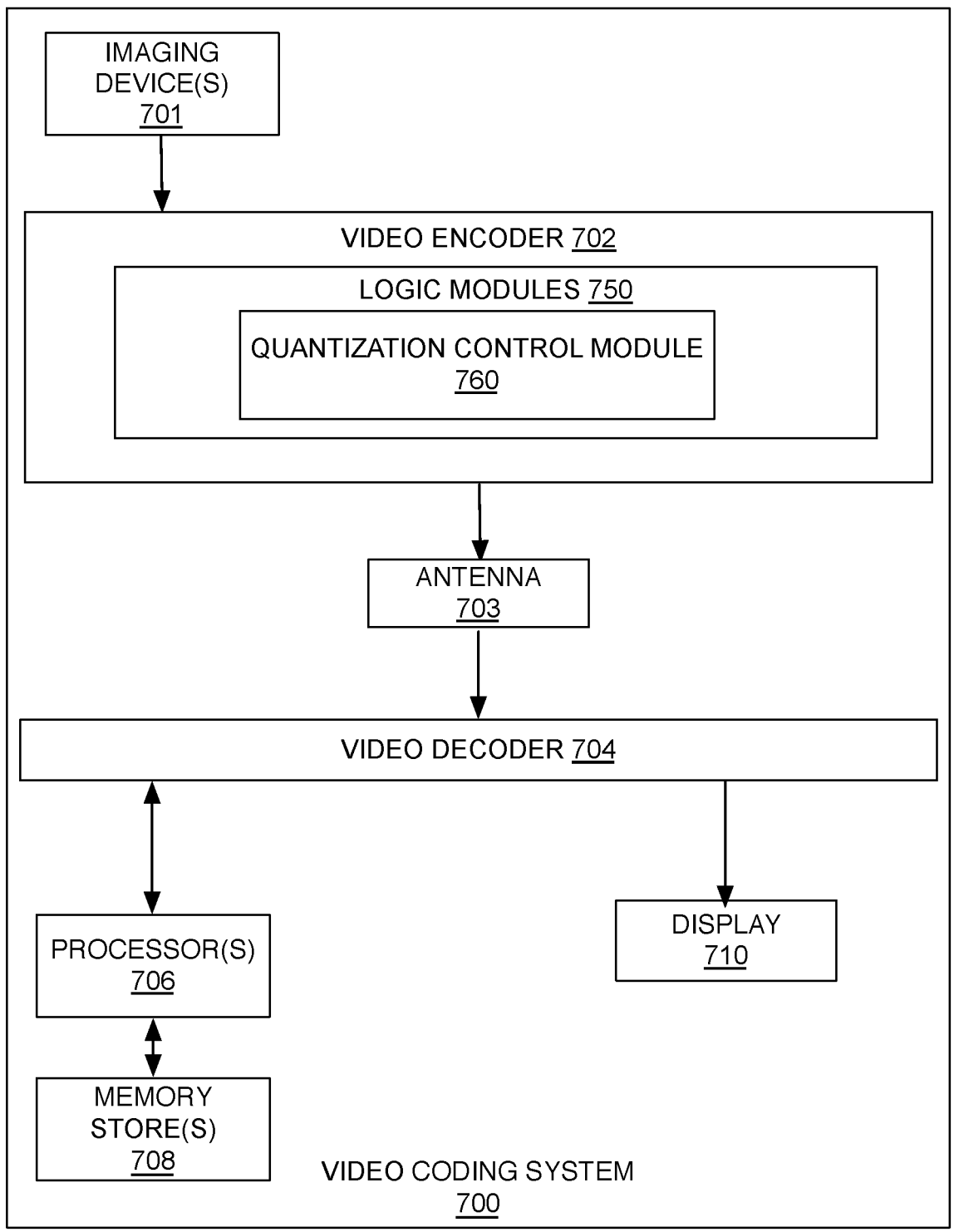
FIG. 7 is an illustrative diagram of an example video coding system.

FIG. 7 is an illustrative diagram of example video coding system 700, arranged in accordance with at least some implementations of the present disclosure. In the illustrated implementation, video coding system 700, although illustrated with both video encoder 702 and video decoder 704, video coding system 700 may include only video encoder 702 or only video decoder 704 in various examples. Video coding system 700 (which may include only video encoder 702 or only video decoder 704 in various examples) may include imaging device(s) 701, an antenna 702, one or more processor(s) 706, one or more memory store(s) 708, and/or a display device 710. As illustrated, imaging device(s) 701, antenna 702, video encoder 702, video decoder 704, processor(s) 706, memory store(s) 708, and/or display device 710 may be capable of communication with one another.

In some implementations, video coding system 700 may include antenna 703. For example, antenna 703 may be configured to transmit or receive an encoded bitstream of video data, for example. Processor(s) 706 may be any type of processor and/or processing unit. For example, processor(s) 706 may include distinct central processing units, distinct graphic processing units, integrated system-on-a-chip (SoC) architectures, the like, and/or combinations thereof. In addition, memory store(s) 708 may be any type of memory. For example, memory store(s) 708 may be volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 708 may be implemented by cache memory. Further, in some implementations, video coding system 700 may include display device 710. Display device 710 may be configured to present video data.

As shown, in some examples, video coding system 700 may include logic modules 750. While illustrated as being associated with video encoder 702, video decoder 704 may similarly be associated with identical and/or similar logic modules as the illustrated logic modules 750. Accordingly, video encoder 702 may include all or portions of logic modules 750. For example, antenna 703, video decoder 704, processor(s) 706, memory store(s) 708, and/or display 710 may be capable of communication with one another and/or communication with portions of logic modules 750. Similarly, video decoder 704 may include identical and/or similar logic modules to logic modules 750. For example, imaging device(s) 701 and video decoder 704 may be capable of communication with one another and/or communication with logic modules that are identical and/or similar to logic modules 750.

In some implementations, logic modules 750 may embody various modules as discussed with respect to any system or subsystem described herein. For example, logic modules 750 may include a quantization control logic module 760 and/or the like, configured to perform some or all of the quantization control processes described herein.

In various embodiments, some of logic modules 750 may be implemented in hardware, while software may implement other logic modules. For example, in some embodiments, some of logic modules 750 may be implemented by application-specific integrated circuit (ASIC) logic while other logic modules may be provided by software instructions executed by logic such as processors 706. However, the present disclosure is not limited in this regard and some of logic modules 750 may be implemented by any combination of hardware, firmware and/or software.

Figure 8:
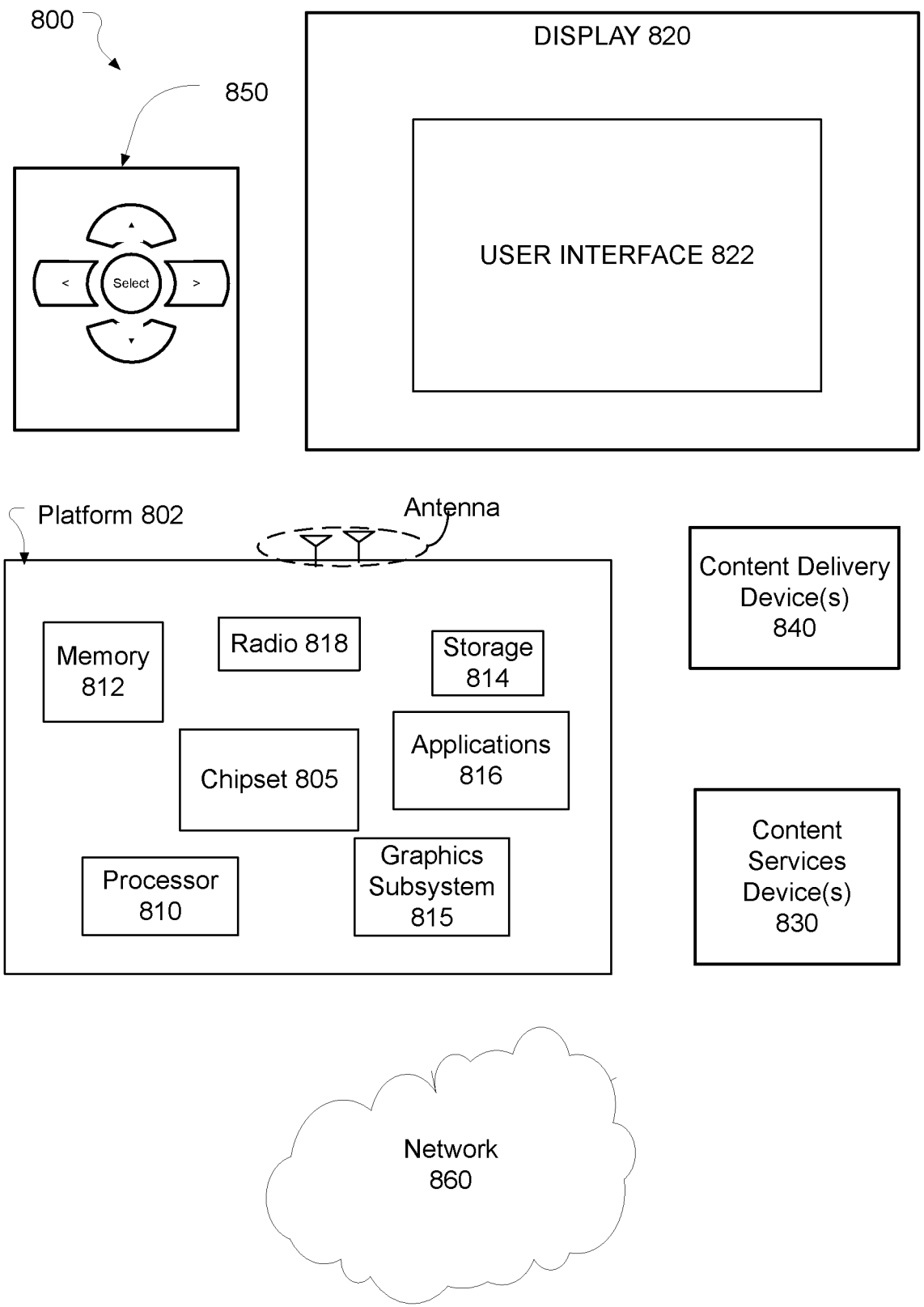
FIG. 8 is an illustrative diagram of an example system.

FIG. 8 is an illustrative diagram of an example system 800, arranged in accordance with at least some implementations of the present disclosure. In various implementations, system 800 may be a media system although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 800 includes a platform 802 coupled to a display 820. Platform 802 may receive content from a content device such as content services device(s) 830 or content delivery device(s) 840 or other similar content sources. A navigation controller 850 including one or more navigation features may be used to interact with, for example, platform 802 and/or display 820. Each of these components is described in greater detail below.

In various implementations, platform 802 may include any combination of a chipset 805, processor 810, memory 812, antenna 813, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 810 may be dual-core processor(s), dual-core mobile processor(s), and so forth.

Memory 812 may be implemented as a volatile memory device such as, but not limited to, a Random Access Memory (RAM), Dynamic Random Access Memory (DRAM), or Static RAM (SRAM).

Storage 814 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 814 may include technology to increase the storage performance enhanced protection for valuable digital media when multiple hard drives are included, for example.

Graphics subsystem 815 may perform processing of images such as still or video for display. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, Display Port, wireless HDMI, and/or wireless HD compliant techniques. Graphics subsystem 815 may be integrated into processor 810 or chipset 805. In some implementations, graphics subsystem 815 may be a stand-alone device communicatively coupled to chipset 805.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 818 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In various implementations, display 820 may include any television type monitor or display. Display 820 may include, for example, a computer display screen, touch screen display, video monitor, television-like device, and/or a television. Display 820 may be digital and/or analog. In various implementations, display 820 may be a holographic display. Also, display 820 may be a transparent surface that may receive a visual projection. Such projections may convey various forms of information, images, and/or objects. For example, such projections may be a visual overlay for a mobile augmented reality (MAR) application. Under the control of one or more software applications 816, platform 802 may display user interface 822 on display 820.

In various implementations, content services device(s) 830 may be hosted by any national, international and/or independent service and thus accessible to platform 802 via the Internet, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820.

In various implementations, content services device(s) 830 may include a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, medical and gaming information, and so forth.

Content services device(s) 830 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 802 may receive control signals from navigation controller 850 having one or more navigation features. The navigation features of controller 850 may be used to interact with user interface 822, for example. In various embodiments, navigation controller 850 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 850 may be replicated on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822. In various embodiments, controller 850 may not be a separate component but may be integrated into platform 802 and/or display 820. The present disclosure, however, is not limited to the elements or in the context shown or described herein.

In various implementations, drivers (not shown) may include technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 even when the platform is turned "off." In addition, chipset 805 may include hardware and/or software support for (5.1) surround sound audio and/or high definition (7.1) surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 8.

Figure 9:
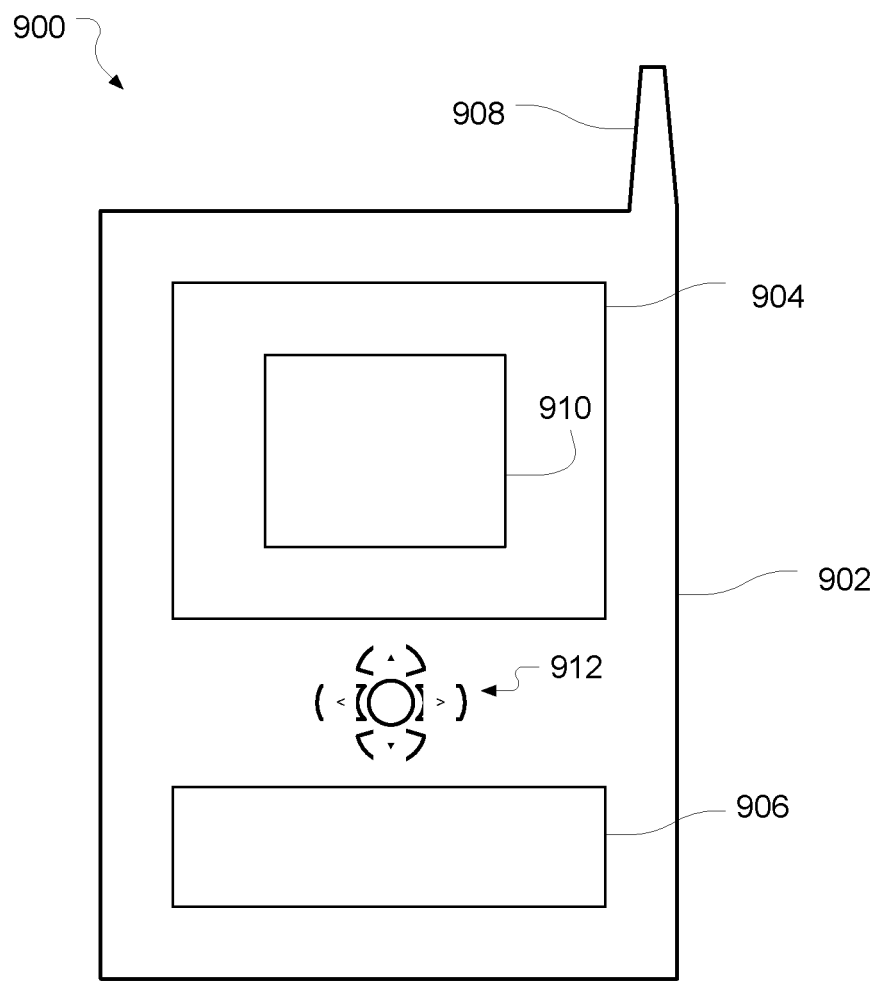
FIG. 9 is an illustrative diagram of an example system, all arranged in accordance with at least some implementations of the present disclosure.

As described above, system 800 may be embodied in varying physical styles or form factors. FIG. 9 illustrates implementations of a small form factor device 900 in which system 900 may be embodied. In various embodiments, for example, device 900 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may include a housing 902, a display 904 which may include a user interface 910, an input/output (I/O) device 906, and an antenna 908. Device 900 also may include navigation features 912. Display 904 may include any suitable display unit for displaying information appropriate for a mobile computing device. I/O device 906 may include any suitable I/O device for entering information into a mobile computing device. Examples for I/O device 906 may include an alphanumeric keyboard, a numeric keypad, a touch pad, input keys, buttons, switches, rocker switches, microphones, speakers, voice recognition device and software, image sensors, and so forth. Information also may be entered into device 900 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the systems as discussed herein.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in the description of the implementation and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. As used in this application and in the claims, a list of items joined by the term "one or more of" may mean any combination of the listed terms. For example, the phrases "one or more of A, B or C" may mean A; B; C; A and B; A and C; B and C; or A, B and C.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

Advantageously, any of the above systems, processors, graphics processors, apparatuses, and/or methods may be integrated or configured with any of the various embodiments described herein (e.g. or portions thereof), including, for example, those described in the following Additional Notes and Examples.

ADDITIONAL NOTES AND EXAMPLES

Example 1 may include a system for video coding on a computer, including: an antenna configured to communicate coded video data; one or more processors communicatively coupled to the antenna; one or more memory stores communicatively coupled to the one or more processors; a coder controller logic module of a video coder communicatively coupled to the one or more processors; and a quantizer logic module communicatively coupled to the coder controller logic module and configured to: determine whether a current coding block is intra coded or inter coded; (in instances where the current coding block is intra coded: count a number of already quantized intra coded blocks; perform Rate Distortion Optimized Quantization on intra coded blocks until a threshold block value is reached when compared to the counted already processed intra coded blocks; and bypass Rate Distortion Optimized Quantization on intra coded blocks when the threshold block value is reached when compared to the counted already processed intra coded blocks).

Example 2 may include the system of claim 1, further including the coder controller logic module being configured to: determine a level of latency sensitivity associated with an active application; and adjust the threshold block value based at least in part on the determined level of latency sensitivity.

Example 3 may include the system of claim 1, where, in instances where the current coding block is intra coded, the quantizer being further configured to: determine whether the block threshold value has been reached when compared to the intra block count.

Example 4 may include the system of claim 1, where, in instances where the current coding block is inter coded: the quantizer being further configured to: perform Rate Distortion Optimized Quantization on all of the inter coded blocks.

Example 5 may include the system of claim 1, further including: the coder controller logic module being configured to: determine a level of latency sensitivity associated with an active application; and adjust the threshold block value based at least in part on the determined level of latency sensitivity, where the threshold block value is set to a minimum threshold block value when the latency sensitivity is at a maximum level of latency sensitivity, where the threshold block value is set to a maximum threshold block value when the latency sensitivity is at a minimum level of latency sensitivity, where the threshold block value is set to an intermediate threshold block value when the latency sensitivity is at an intermediate level of latency sensitivity, where the threshold block value is set to the intermediate threshold block value near the minimum threshold block value when the latency sensitivity is at an intermediate level of latency sensitivity near the maximum level of latency sensitivity, and where the threshold block value is set to the intermediate threshold block value near the maximum threshold block value when the latency sensitivity is at an intermediate level of latency sensitivity near the minimum level of latency sensitivity; where, in instances where the current coding block is intra coded, the quantizer being further configured to: determine whether the block threshold value has been reached when compared to the intra block count; and in instances where the current coding block is inter coded: the quantizer being further configured to: perform Rate Distortion Optimized Quantization on all of the inter coded blocks.

Example 6 may include an apparatus for video coding on a computer, including: a coder controller logic module; and a quantizer logic module communicatively coupled to the coder controller logic module and configured to: determine whether a current coding block is intra coded or inter coded; (in instances where the current coding block is intra coded: count a number of already quantized intra coded blocks; perform Rate Distortion Optimized Quantization on intra coded blocks until a threshold block value is reached when compared to the counted already processed intra coded blocks; and bypass Rate Distortion Optimized Quantization on intra coded blocks when the threshold block value is reached when compared to the counted already processed intra coded blocks).

Example 7 may include the apparatus of claim 6, further including the coder controller logic module being configured to: determine a level of latency sensitivity associated with an active application; and adjust the threshold block value based at least in part on the determined level of latency sensitivity.

Example 8 may include the apparatus of claim 6, where, in instances where the current coding block is intra coded, the quantizer being further configured to: determine whether the block threshold value has been reached when compared to the intra block count.

Example 9 may include the apparatus of claim 6, where, in instances where the current coding block is inter coded: the quantizer being further configured to: perform Rate Distortion Optimized Quantization on all of the inter coded blocks.

Example 10 may include the apparatus of claim 6, further including: the coder controller logic module being configured to: determine a level of latency sensitivity associated with an active application; and adjust the threshold block value based at least in part on the determined level of latency sensitivity, where the threshold block value is set to a minimum threshold block value when the latency sensitivity is at a maximum level of latency sensitivity, where the threshold block value is set to a maximum threshold block value when the latency sensitivity is at a minimum level of latency sensitivity, where the threshold block value is set to an intermediate threshold block value when the latency sensitivity is at an intermediate level of latency sensitivity, where the threshold block value is set to the intermediate threshold block value near the minimum threshold block value when the latency sensitivity is at an intermediate level of latency sensitivity near the maximum level of latency sensitivity, and where the threshold block value is set to the intermediate threshold block value near the maximum threshold block value when the latency sensitivity is at an intermediate level of latency sensitivity near the minimum level of latency sensitivity; where, in instances where the current coding block is intra coded, the quantizer being further configured to: determine whether the block threshold value has been reached when compared to the intra block count; and in instances where the current coding block is inter coded: the quantizer being further configured to: perform Rate Distortion Optimized Quantization on all of the inter coded blocks.

Example 11 may include a computer-implemented method for video coding, including: determining, via a quantizer, whether a current coding block is intra coded or inter coded; (in instances where the current coding block is intra coded: counting, via the quantizer, a number of already quantized intra coded blocks; performing, via the quantizer, Rate Distortion Optimized Quantization on intra coded blocks until a threshold block value is reached when compared to the counted already processed intra coded blocks; and bypassing, via the quantizer, Rate Distortion Optimized Quantization on intra coded blocks when the threshold block value is reached when compared to the counted already processed intra coded blocks).

Example 12 may include the method of claim 11, further including: determining, via a coder controller, a level of latency sensitivity associated with an active application; and adjusting, via the coder controller, the threshold block value based at least in part on the determined level of latency sensitivity.

Example 13 may include the method of claim 11, further including: determining, via a coder controller, a level of latency sensitivity associated with an active application; and adjusting, via the coder controller, the threshold block value based at least in part on the determined level of latency sensitivity, where the threshold block value is set to a minimum threshold block value when the latency sensitivity is at a maximum level of latency sensitivity.

Example 14 may include the method of claim 11, further including: determining, via a coder controller, a level of latency sensitivity associated with an active application; and adjusting, via the coder controller, the threshold block value based at least in part on the determined level of latency sensitivity, where the threshold block value is set to a maximum threshold block value when the latency sensitivity is at a minimum level of latency sensitivity.

Example 15 may include the method of claim 11, further including: determining, via a coder controller, a level of latency sensitivity associated with an active application; and adjusting, via the coder controller, the threshold block value based at least in part on the determined level of latency sensitivity, where the threshold block value is set to an intermediate threshold block value when the latency sensitivity is at an intermediate level of latency sensitivity.

Example 16 may include the method of claim 11, further including: determining, via a coder controller, a level of latency sensitivity associated with an active application; and adjusting, via the coder controller, the threshold block value based at least in part on the determined level of latency sensitivity, where the threshold block value is set to the intermediate threshold block value near the minimum threshold block value when the latency sensitivity is at an intermediate level of latency sensitivity near the maximum level of latency sensitivity.

Example 17 may include the method of claim 11, further including: determining, via a coder controller, a level of latency sensitivity associated with an active application; and adjusting, via the coder controller, the threshold block value based at least in part on the determined level of latency sensitivity, where the threshold block value is set to the intermediate threshold block value near the maximum threshold block value when the latency sensitivity is at an intermediate level of latency sensitivity near the minimum level of latency sensitivity.

Example 18 may include the method of claim 11, where, in instances where the current coding block is intra coded, further includes: determining, via the quantizer, whether the block threshold value has been reached when compared to the intra block count.

Example 19 may include the method of claim 11, further including: in instances where the current coding block is inter coded: performing, via the quantizer, Rate Distortion Optimized Quantization on all of the inter coded blocks.

Example 20 may include the method of claim 11, further including: determining, via a coder controller, a level of latency sensitivity associated with an active application; adjusting, via the coder controller, the threshold block value based at least in part on the determined level of latency sensitivity, where the threshold block value is set to a minimum threshold block value when the latency sensitivity is at a maximum level of latency sensitivity, where the threshold block value is set to a maximum threshold block value when the latency sensitivity is at a minimum level of latency sensitivity, where the threshold block value is set to an intermediate threshold block value when the latency sensitivity is at an intermediate level of latency sensitivity, where the threshold block value is set to the intermediate threshold block value near the minimum threshold block value when the latency sensitivity is at an intermediate level of latency sensitivity near the maximum level of latency sensitivity, and where the threshold block value is set to the intermediate threshold block value near the maximum threshold block value when the latency sensitivity is at an intermediate level of latency sensitivity near the minimum level of latency sensitivity; where, in instances where the current coding block is intra coded, further includes: determining, via the quantizer, whether the block threshold value has been reached when compared to the intra block count; and in instances where the current coding block is inter coded: performing, via the quantizer, Rate Distortion Optimized Quantization on all of the inter coded blocks.

Example 21 may include at least one machine readable medium including: a plurality of instructions that in response to being executed on a computing device, causes the computing device to: determine whether a current coding block is intra coded or inter coded; (in instances where the current coding block is intra coded: count a number of already quantized intra coded blocks; perform Rate Distortion Optimized Quantization on intra coded blocks until a threshold block value is reached when compared to the counted already processed intra coded blocks; and bypass Rate Distortion Optimized Quantization on intra coded blocks when the threshold block value is reached when compared to the counted already processed intra coded blocks).

Example 22 may include the at least one machine readable medium method of claim 21, further including causing the computing device to: determine a level of latency sensitivity associated with an active application; and adjust the threshold block value based at least in part on the determined level of latency sensitivity, where the threshold block value is set to a minimum threshold block value when the latency sensitivity is at a maximum level of latency sensitivity, where the threshold block value is set to a maximum threshold block value when the latency sensitivity is at a minimum level of latency sensitivity, where the threshold block value is set to an intermediate threshold block value when the latency sensitivity is at an intermediate level of latency sensitivity, where the threshold block value is set to the intermediate threshold block value near the minimum threshold block value when the latency sensitivity is at an intermediate level of latency sensitivity near the maximum level of latency sensitivity, and where the threshold block value is set to the intermediate threshold block value near the maximum threshold block value when the latency sensitivity is at an intermediate level of latency sensitivity near the minimum level of latency sensitivity; where, in instances where the current coding block is intra coded: determine whether the block threshold value has been reached when compared to the intra block count; and in instances where the current coding block is inter coded: perform Rate Distortion Optimized Quantization on all of the inter coded blocks.

Example 23 may include at least one machine readable medium comprising: a plurality of instructions that in response to being executed on a computing device, causes the computing device to perform the method according to any one of examples 11-20.

Example 24 may include an apparatus, including: means for performing the methods according to any one of examples 11-20.

Example 25 may include an apparatus, including means for performing a method as claimed in any preceding examples.

Example 26 may include a machine-readable storage including machine-readable instructions which, when executed, implement a method or realize an apparatus as claimed in any preceding examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

We claim:

1. A system for video coding on a computer, comprising:
an antenna configured to communicate coded video data;

one or more processors communicatively coupled to the antenna;
one or more memory stores communicatively coupled to the one or more processors;
a coder controller logic module of a video coder communicatively coupled to the one or more processors; and
a quantizer logic module communicatively coupled to the coder controller logic module and configured to:
determine whether a current coding block is intra coded or inter coded;
in instances where the current coding block is intra coded:
determine a level of latency sensitivity associated with an active application;
adjust a threshold block value based at least in part on the determined level of latency sensitivity;
count a number of already quantized intra coded blocks;
perform Rate Distortion Optimized Quantization on intra coded blocks until the threshold block value is reached when compared to the counted already processed intra coded blocks; and
bypass Rate Distortion Optimized Quantization on intra coded blocks when the threshold block value is reached when compared to the counted already processed intra coded blocks.

2. The system of claim 1, wherein, in instances where the current coding block is intra coded, the quantizer being further configured to: determine whether the block threshold value has been reached when compared to the intra block count.

3. The system of claim 1, wherein, in instances where the current coding block is inter coded: the quantizer being further configured to: perform Rate Distortion Optimized Quantization on all of the inter coded blocks.

4. The system of claim 1, further comprising:
the coder controller logic module being configured to:
wherein the threshold block value is set to a minimum threshold block value when the latency sensitivity is at a maximum level of latency sensitivity, wherein the threshold block value is set to a maximum threshold block value when the latency sensitivity is at a minimum level of latency sensitivity, wherein the threshold block value is set to an intermediate threshold block value when the latency sensitivity is at an intermediate level of latency sensitivity, wherein the threshold block value is set to the intermediate threshold block value near the minimum threshold block value when the latency sensitivity is at an intermediate level of latency sensitivity near the maximum level of latency sensitivity, and wherein the threshold block value is set to the intermediate threshold block value near the maximum threshold block value when the latency sensitivity is at an intermediate level of latency sensitivity near the minimum level of latency sensitivity;
wherein, in instances where the current coding block is intra coded, the quantizer being further configured to: determine whether the block threshold value has been reached when compared to the intra block count; and
in instances where the current coding block is inter coded: the quantizer being further configured to: perform Rate Distortion Optimized Quantization on all of the inter coded blocks.

5. An apparatus for video coding on a computer, comprising:
a coder controller logic module; and
a quantizer logic module communicatively coupled to the coder controller logic module and configured to:
determine whether a current coding block is intra coded or inter coded;
in instances where the current coding block is intra coded:
determine a level of latency sensitivity associated with an active application;
adjust the threshold block value based at least in part on the determined level of latency sensitivity;
count a number of already quantized intra coded blocks;
perform Rate Distortion Optimized Quantization on intra coded blocks until the threshold block value is reached when compared to the counted already processed intra coded blocks; and
bypass Rate Distortion Optimized Quantization on intra coded blocks when the threshold block value is reached when compared to the counted already processed intra coded blocks.

6. The apparatus of claim 5, wherein, in instances where the current coding block is intra coded, the quantizer being further configured to: determine whether the block threshold value has been reached when compared to the intra block count.

7. The apparatus of claim 5, wherein, in instances where the current coding block is inter coded: the quantizer being further configured to: perform Rate Distortion Optimized Quantization on all of the inter coded blocks.

8. The apparatus of claim 5, further comprising:
the coder controller logic module being configured to:
wherein the threshold block value is set to a minimum threshold block value when the latency sensitivity is at a maximum level of latency sensitivity, wherein the threshold block value is set to a maximum threshold block value when the latency sensitivity is at a minimum level of latency sensitivity, wherein the threshold block value is set to an intermediate threshold block value when the latency sensitivity is at an intermediate level of latency sensitivity, wherein the threshold block value is set to the intermediate threshold block value near the minimum threshold block value when the latency sensitivity is at an intermediate level of latency sensitivity near the maximum level of latency sensitivity, and wherein the threshold block value is set to the intermediate threshold block value near the maximum threshold block value when the latency sensitivity is at an intermediate level of latency sensitivity near the minimum level of latency sensitivity;
wherein, in instances where the current coding block is intra coded, the quantizer being further configured to: determine whether the block threshold value has been reached when compared to the intra block count; and
in instances where the current coding block is inter coded: the quantizer being further configured to: perform Rate Distortion Optimized Quantization on all of the inter coded blocks.

9. A computer-implemented method for video coding, comprising:
determining, via a quantizer, whether a current coding block is intra coded or inter coded;
in instances where the current coding block is intra coded:
determining, via a coder controller, a level of latency sensitivity associated with an active application;

adjusting, via the coder controller, the threshold block value based at least in part on the determined level of latency sensitivity;

counting, via the quantizer, a number of already quantized intra coded blocks;

performing, via the quantizer, Rate Distortion Optimized Quantization on intra coded blocks until the threshold block value is reached when compared to the counted already processed intra coded blocks; and bypassing, via the quantizer, Rate Distortion Optimized Quantization on intra coded blocks when the threshold block value is reached when compared to the counted already processed intra coded blocks.

10. The method of claim 9, further comprising:
wherein the threshold block value is set to a minimum threshold block value when the latency sensitivity is at a maximum level of latency sensitivity.

11. The method of claim 9, further comprising:
wherein the threshold block value is set to a maximum threshold block value when the latency sensitivity is at a minimum level of latency sensitivity.

12. The method of claim 9, further comprising:
wherein the threshold block value is set to an intermediate threshold block value when the latency sensitivity is at an intermediate level of latency sensitivity.

13. The method of claim 9, further comprising:
wherein the threshold block value is set to the intermediate threshold block value near the minimum threshold block value when the latency sensitivity is at an intermediate level of latency sensitivity near the maximum level of latency sensitivity.

14. The method of claim 9, further comprising:
wherein the threshold block value is set to the intermediate threshold block value near the maximum threshold block value when the latency sensitivity is at an intermediate level of latency sensitivity near the minimum level of latency sensitivity.

15. The method of claim 9, wherein, in instances where the current coding block is intra coded, further comprises: determining, via the quantizer, whether the block threshold value has been reached when compared to the intra block count.

16. The method of claim 9, further comprising:
in instances where the current coding block is inter coded: performing, via the quantizer, Rate Distortion Optimized Quantization on all of the inter coded blocks.

17. The method of claim 9, further comprising:
wherein the threshold block value is set to a minimum threshold block value when the latency sensitivity is at a maximum level of latency sensitivity, wherein the threshold block value is set to a maximum threshold block value when the latency sensitivity is at a minimum level of latency sensitivity, wherein the threshold block value is set to an intermediate threshold block value when the latency sensitivity is at an intermediate level of latency sensitivity, wherein the threshold block value is set to the intermediate threshold block value near the minimum threshold block value when the latency sensitivity is at an intermediate level of latency sensitivity near the maximum level of latency sensitivity, and wherein the threshold block value is set to the intermediate threshold block value near the maximum threshold block value when the latency sensitivity is at an intermediate level of latency sensitivity near the minimum level of latency sensitivity;

wherein, in instances where the current coding block is intra coded, further comprises: determining, via the quantizer, whether the block threshold value has been reached when compared to the intra block count; and in instances where the current coding block is inter coded:
performing, via the quantizer, Rate Distortion Optimized Quantization on all of the inter coded blocks.

18. At least one non-transitory machine readable medium comprising: a plurality of instructions that in response to being executed on a computing device, causes the computing device to:

determine whether a current coding block is intra coded or inter coded;

in instances where the current coding block is intra coded:
determine a level of latency sensitivity associated with an active application;
adjust the threshold block value based at least in part on the determined level of latency sensitivity;
count a number of already quantized intra coded blocks;
perform Rate Distortion Optimized Quantization on intra coded blocks until the threshold block value is reached when compared to the counted already processed intra coded blocks; and
bypass Rate Distortion Optimized Quantization on intra coded blocks when the threshold block value is reached when compared to the counted already processed intra coded blocks.

19. The at least one non-transitory machine readable medium method of claim 18, further comprising causing the computing device to:

wherein the threshold block value is set to a minimum threshold block value when the latency sensitivity is at a maximum level of latency sensitivity, wherein the threshold block value is set to a maximum threshold block value when the latency sensitivity is at a minimum level of latency sensitivity, wherein the threshold block value is set to an intermediate threshold block value when the latency sensitivity is at an intermediate level of latency sensitivity, wherein the threshold block value is set to the intermediate threshold block value near the minimum threshold block value when the latency sensitivity is at an intermediate level of latency sensitivity near the maximum level of latency sensitivity, and wherein the threshold block value is set to the intermediate threshold block value near the maximum threshold block value when the latency sensitivity is at an intermediate level of latency sensitivity near the minimum level of latency sensitivity;

wherein, in instances where the current coding block is intra coded: determine whether the block threshold value has been reached when compared to the intra block count; and in instances where the current coding block is inter coded:
perform Rate Distortion Optimized Quantization on all of the inter coded blocks.

* * * * *